No. 877,450. PATENTED JAN. 21, 1908.
R. W. PERRY.
CUSHION HEEL.
APPLICATION FILED MAY 22, 1907.
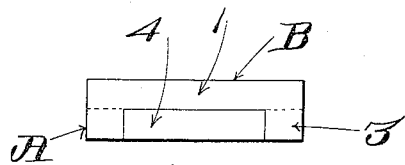
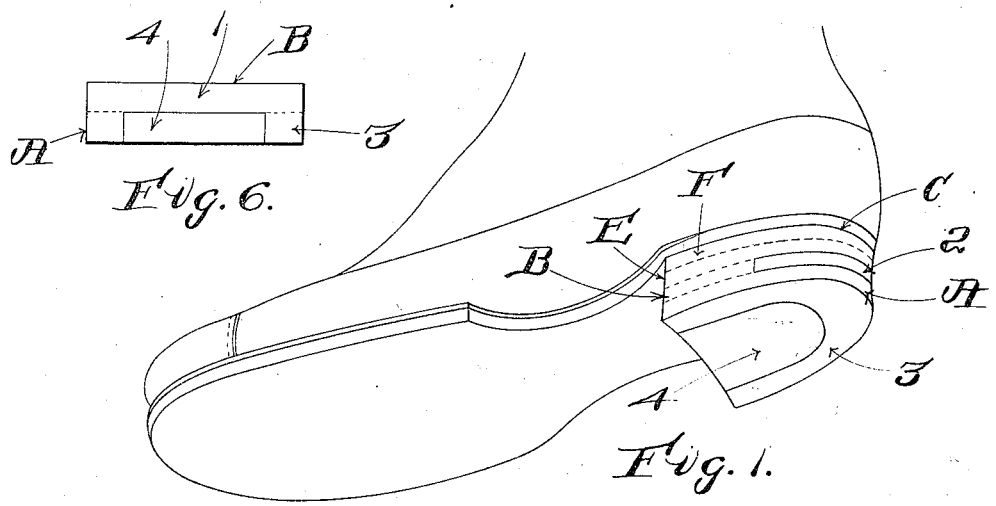
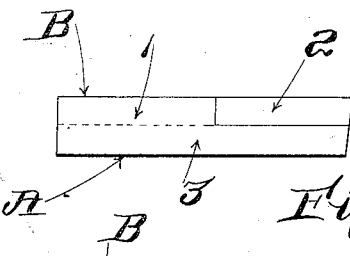
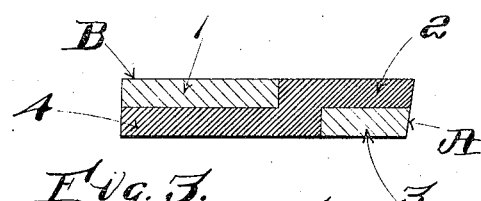
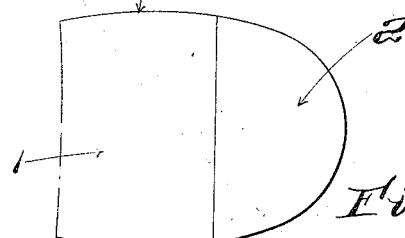
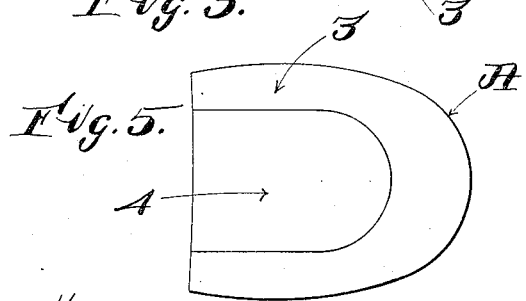
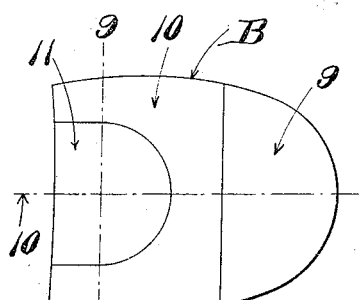
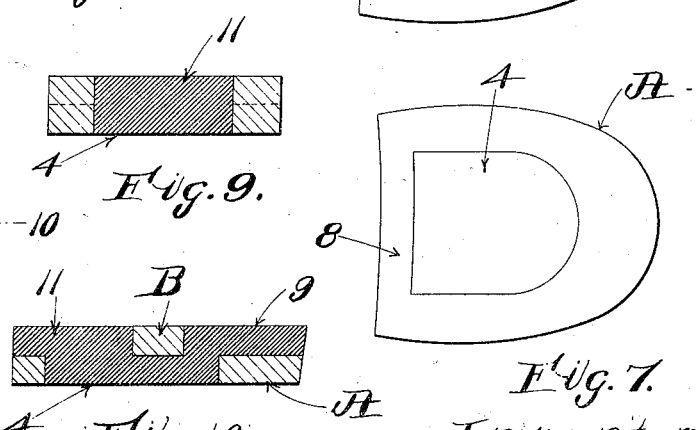
Witnesses:
John H. Parker
R. Wallace
Inventor:
Reuben W. Perry
by Macleod, Calver, Copeland & Dike
Attorneys

UNITED STATES PATENT OFFICE.

REUBEN W. PERRY, OF STONEHAM, MASSACHUSETTS, ASSIGNOR OF ONE-HALF TO GEORGE H. STEVENS, OF MELROSE, MASSACHUSETTS.

CUSHION-HEEL.

No. 877,450.

Specification of Letters Patent.

Patented Jan. 21, 1908.

Application filed May 22, 1907. Serial No. 375,033.

*To all whom it may concern:*

Be it known that I, REUBEN W. PERRY, citizen of the United States, residing at Stoneham, in the county of Middlesex and State of Massachusetts, have invented a certain new and useful Improvement in Cushion-Heels, of which the following is a specification, reference being had therein to the accompanying drawings.

The invention relates to an improved cushion heel composed in part of leather and in part of rubber.

A combination heel in which the top lift, that is the tread face of the heel, is all rubber and the remainder of the heel is leather may have to some extent the cushion feature and may be cheaper than an all rubber heel, but it lacks the anti-slipping feature which is given by forming the tread surface of part rubber and part some other material, such as leather, and it also wears down too quickly at the rear end of the heel where the greatest wear usually comes.

The object of the present invention is to provide a cushion heel having both the cushion and anti-slipping characteristics combined and to produce this effect in an economical manner by a peculiar combination of rubber with leather or other relatively inelastic material having the rubber and leather so distributed as to have the leather take up the wear where the wear is the greatest and to have the exposed portion of the rubber on the tread face where it will coöperate with the leather in producing the anti-slipping feature, yet where it will be exposed to the minimum amount of wear and to have both the exposed and the unexposed portion of the rubber so located as to give the cushion effect to the entire heel.

The invention will be fully understood from the following description taken in connection with the accompanying drawings, and the novel features thereof are pointed out and clearly defined in the claims at the close of the specification.

In the drawings,—Figure 1 is a perspective of a portion of a shoe having a heel constructed according to the invention. Fig. 2 is a side elevation of a detached heel composed of two lifts as it will ordinarily be when made to be sold as a separate article of manufacture. Fig. 3 is a longitudinal central section of the heel shown in Fig. 2. Fig. 4 is a plan view of the upper side of the heel shown in Fig. 2. Fig. 5 is a plan view of the under side; that is, the tread surface of the top lift of the heel, shown in Fig. 2. Fig. 6 is a front end elevation of the detached heel. Fig. 7 is a plan view of the upper side of a modified form of heel. Fig. 8 is a plan view of the under side of the heel shown in Fig. 7. Fig. 9 is a cross-section on line 9—9 of Fig. 8. Fig. 10 is a longitudinal section on line 10—10 of Fig. 8.

Referring to Figs. 1 to 6, A represents the top lift, that is the lift which comes on the tread side of the heel, and B represents the bottom lift. The heel of the shoe C to which the combination heel is to be attached may be built up if desired with additional lifts E, F, or any other number to make the required height of heel. The top lift A comprises a leather marginal portion 3, preferably horse-shoe shaped, and a central rubber portion 4, while the bottom lift B comprises a leather portion 1 forming the fore part of the lift and a rear portion 2 forming the rear part of the lift, the rubber portion 2 of the bottom lift lapping over onto the rear part of the rubber portion 4 of the top lift as clearly shown in Fig. 3. The rubber and leather portions of both lifts are all thoroughly united by vulcanization.

In forming the heel the horse-shoe shaped leather portion 3 of the top lift is first placed in a mold and the space between the branches of the leather portion 3 is filled up with unvulcanized rubber. The leather portion 1 which forms the fore part of the lift B is then placed in the fore part of the mold on top of the rubber 4, and the space at the rear of the portion 1 is filled with unvulcanized rubber and the mold is then closed and subjected to a sufficient degree of heat to vulcanize the rubber and cause the rubber portions 2, 4, of the two lifts to become solidly united together and also to cause the leather portions 1, 3, of the lifts to be thoroughly united to the rubber. The rear portion and the sides of the tread face of the heel being of leather take up the wear where it mostly occurs and at the same time the rubber portion 4 coöperates with the leather portion 3 to aid in preventing slipping on wet surfaces. The rubber rear portion 2 of the second lift forms a spring cushion for the rear part of the heel with as much effectiveness as if the rubber came directly in contact with the ground without being exposed to wear.

An important feature of this form of construction is that the forward end of the rubber portion 2 of the lift B laps over the rear end of the rubber portion 4 of the top lift A, thus making a double thickness of rubber for a certain distance intermediate the front and rear ends of the heel, and giving a sort of a spring hinge effect to the heel which materially aids in the cushioning quality.

In the modification shown in Figs. 7 to 10, the leather portion of the top lift A has a cross portion 8 connecting the two forward ends of the horns of the leather portion, thus making an entire margin of leather and a little more solid breast to the heel on the tread side than the form shown in Figs. 1 to 6 where the breast end is rubber. The lift B has the rear portion 9 of rubber similar to the construction already described and shown in Fig. 4, but the leather portion 10 of the said lift has a segmental portion cut out of its forward end which is filled in with a rubber portion 11, thus making the forward end of the heel with leather on the tread side thereof and rubber above it, while in the form first described, as shown in Fig. 3, the breast portion of the tread side is rubber, while the portion above it is leather.

In the modified form described, as well as in the first form described, the rear portion of the tread side of the heel is leather and a layer of rubber is above it and the rubber portion of the two lifts overlap each other at their inner ends, thus securing the spring joint feature already described.

By the construction of a heel such as I have described, the marginal portion of the top lift along the line where the nails are usually driven being all leather, it is not necessary to make any nail holes, and the heel may be blind nailed to the shoe so that no portion of the nail will appear on the exposed surface of the heel. When the heel is attached to the shoe there will be only a very slight exposed portion of rubber on the side of the heel and on account of the top lift being of leather and the small exposed portion of rubber 2 being between two leather lifts, the heel can be finished so that the rubber will be very inconspicuous.

An additonal advantage of having such a small exposed portion of rubber and having it covered by the top lift is that it is less liable to catch in the skirts when used on ladies' shoes than when the entire lift is of rubber.

I claim as my invention:

1. As a new article of manufacture, a cushion heel having a top lift whose rear and side portions are of leather and whose middle portion is of rubber, and a bottom lift whose rear portion is rubber and whose forward portion is leather, the forward end of the upper rubber portion and the rear end of the lower rubber portion of the two lifts overlapping each other and being vulcanized together, the rubber portion of the top lift extending further forward than the rubber portion of the bottom lift, and the rubber portion of the bottom lift extending further rearward than the rubber portion of the top lift.

2. As a new article of manufacture, a cushion heel having a top lift whose rear and side portions are of leather of horse-shoe shape, and whose middle portion is of rubber, and a bottom lift whose rear portion is rubber and whose forward portion is of leather, the forward end of the rubber portion of the bottom lift and the rear end of the rubber portion of the top lift overlapping each other and being vulcanized together, the rubber portion of the top lift extending further forward than the rubber portion of the bottom lift and the rubber portion of the bottom lift extending further rearward than the rubber portion of the top lift.

In testimony whereof I affix my signature, in presence of two witnesses.

REUBEN W. PERRY.

Witnesses:
WILLIAM A. COPELAND,
JOHN H. PARKER.